Nov. 15, 1966 J. W. LUCAS 3,285,126

DESK LEVEL OVERHEAD PROJECTOR

Original Filed March 18, 1960 2 Sheets-Sheet 1

INVENTOR.
James W. Lucas
BY Griffin & Branigan
ATTORNEY

Nov. 15, 1966  J. W. LUCAS  3,285,126
DESK LEVEL OVERHEAD PROJECTOR
Original Filed March 18, 1960  2 Sheets-Sheet 2

INVENTOR.
James W. Lucas
BY Griffin & Branigan
ATTORNEYS 3,285,126
DESK LEVEL OVERHEAD PROJECTOR
James W. Lucas, 1480 N. Doheny Drive,
Los Angeles, Calif.
Application Apr. 18, 1966, Ser. No. 543,000, which is a continuation of application Ser. No. 463,464, May 27, 1965, which is a continuation of application Ser. No. 214,784, July 25, 1962, which in turn is a substitute of Ser. No. 16,017, Mar. 18, 1960. Divided and this application May 6, 1966, Ser. No. 548,214
19 Claims. (Cl. 88—24)

This is a division of application Serial Number 543,000 filed on April 18, 1966, which is a continuation of application Serial Number 463,464 filed on May 27, 1965, which is a continuation of Serial Number 214,784 filed July 25, 1962, now abandoned, which in turn was a substitute for Serial Number 16,017 filed March 18, 1960, now abandoned. This invention relates generally to overhead projectors and, more particularly, to those adapted for adding information to reprojected film strips and slides, and containing their own light sources. A machine which fits within this particular classification will be found described in my Patent No. 3,124,035 which issued on March 10, 1964.

Overhead projectors have always directed the light beam through the picture aperture from a box under this aperture. This configuration dictated two restrictions in the design of these projectors: (1) Material to be projected had to be transparent, and (2) the level of the picture aperture had to be raised above the level of the desk by a distance approximating the width of the picture aperture. Present opaque projectors circumvent both these restrictions, but cannot be used to project transparent material, or to add information to images projected from slides and strip film.

Conventional overhead projectors generally require separate cases for storage, primarily because the large projection head and supporting tube required cannot fit into the space available within the light box. The projection lens assembly must be moved approximately 2 inches each side of the light cone apex in order to focus for the required screen distances. This requires a large diameter objective. A mirror is used either above or below the lens to redirect the light beam toward the screen, and to raise or lower the projected image for various screen heights. This mirror must completely intercept a variable, expanding light cone from a large diameter objective, while the mirror makes an angle of less than 45° with the beam axis. It is therefore easy to see that a large mirror is required, and that a strong support must be used to eliminate vibration, while allowing the head assembly to be moved for focusing.

Another characteristic feature of overhead projectors is the use of a band of transparent material adapted for moving across the picture aperture in either direction. Since the material can cross the aperture only once, there must be a takeup spool on each side of the picture aperture, and two separate cranks are required for moving the material. Each crank will move the band only one direction, so that accurately locating prepared notations relative to a fixed picture requires alternate manipulation of the oppositely located cranks. With the takeup spools located separately, sufficient space must be provided at each location to accommodate a fully wound spool, although only one can be full at any given time.

The device of my invention might best be described as a compact desk level, multi-purpose overhead projector. The primary distinguishing feature of my novel projector is the use of reflection, rather than refraction, at the picture aperture to concentrate the light beam into the upper projection lens.

A principal object of my invention is to make possible a compact overhead projector with a large picture aperture.

A further object is to provide an overhead projector in which the picture aperture is at desk level.

An additional object is the provision of an inexpensive folding overhead projector which forms its own case, having one dimension less than the width of the picture aperture.

A still further object is to provide a multi-purpose machine, usable concurrently as a slide or strip film projector, an overhead projector, an opaque projector, or an overhead projector using images reprojected from slides or strip film.

Another object of my invention is the provision of an overhead projector in which the dimensions and complexity of the upper projection head are substantially reduced.

Yet another object is to provide an overhead projector in which the band of transparent material can be moved in either direction by the same crank.

An additional object is the provision of an opaque projector adapted to add information to images projected from slides and strip film.

Another principal object is to provide an overhead projection adapter for use with external conventional slide, strip film or motion picture projectors or microscopes, in which the picture aperture is at desk level.

In brief, the principle of my novel projector is as follows: A plane mirror, adjacent to the upper projection head, is effective to intercept an upwardly directed light beam, which may or may not contain an image, and redirect the beam down into a picture aperture at desk level. A concave reflector directly below this aperture reflects the light beam and concentrates it into the upper projection lens, simultaneously allowing a faint residual image to appear at the surface of the reflector, if an image was contained in the light beam. The upper projection head is then effective to focus the light beam on a screen in the normal manner.

Additional objects and distinguishing features of this invention will become apparent from the following detailed specification, and by reference to the accompanying drawings, of which:

Figure 1:
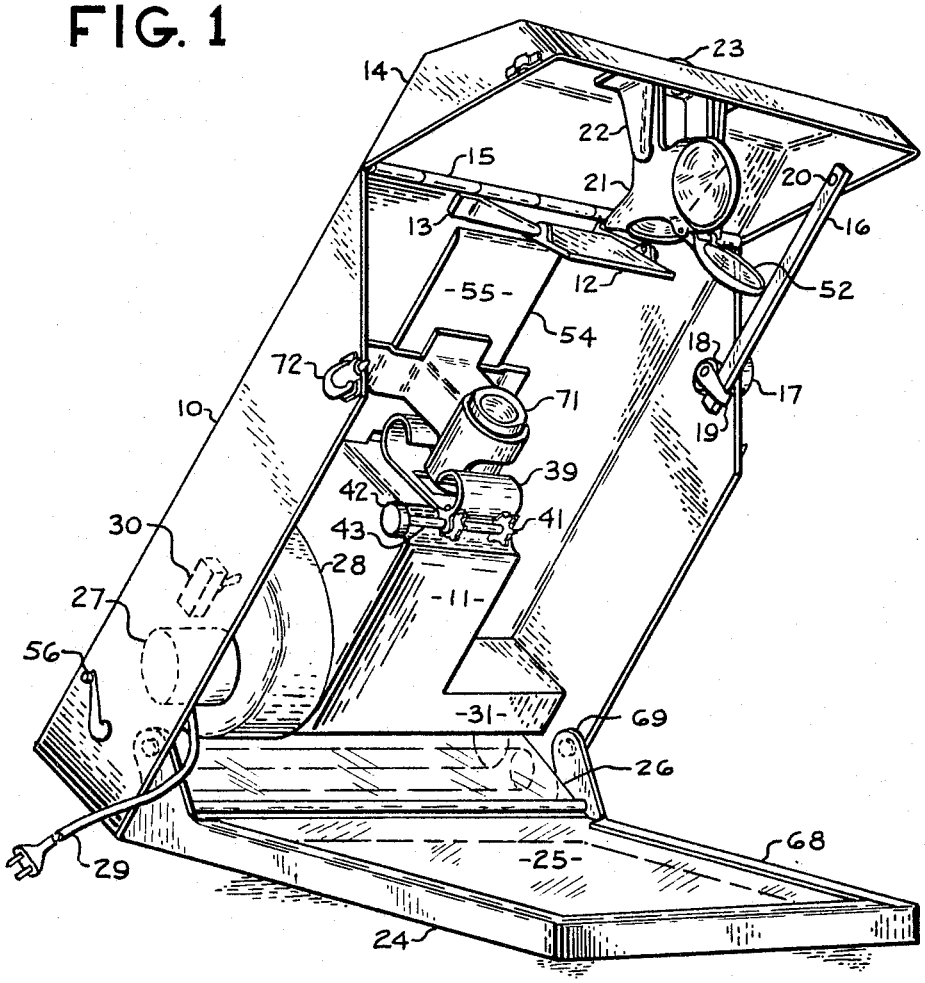
FIGURE 1 is a perspective view of the projector in operating position, as seen by the operator.

My novel overhead projector eliminates the need for a large box below the picture aperture by illuminating the aperture from above. This arrangement allows the aperture to be at the level of the desk, thus providing a more comfortable operating position. Several other distinct advantages result from this configuration. The overall size of the units is substantially reduced, resulting in lower cost and decreased complexity. Since the area directly below the picture aperture is now opaque, the band of transparent material can reverse its direction underneath the concave reflector, permitting the takeup spools to be adjacent one another. The center to center distance between the spools can be substantially less than the diameter of a fully wound spool, since the maximum separation is required when both spools are half wound. The adjacent placement of the spools also allows the use of a single crank to move the transparent band in both directions. The desk level configuration also permits my projector to be used with opaque subject matter, since the picture area is illuminated from above.

The projection head of overhead projectors must be rigidly suspended above the center of the picture aperture. In the projector of my design, this rigid supporting structure is used to house the light source and its associated optical components, including the film strip and slide projection elements. A plane mirror is located adjacent the projection head, and this mirror serves three functions. The optical path of the primary projected image is reversed, and thus given sufficient length to develop an image of the required size at the picture aperture. The mirror can be tilted to receive images from an external projector, thus permitting my device to be used with motion picture and television projectors. Further tilting of the mirror adapts the internal projector to form images directly onto a screen or ceiling.

The upper portion of the projection head support is hinged at one side, allowing the head to be focused without the usual sliding motion.

Both complexity and vibration are thus reduced, and tilting of the head can be accomplished by a direct connection to the head support. Hinging the upper portion also results in a substantial reduction in overall length when the projector is closed.

The size of the projection head is substantially reduced in several unusual ways. First, a lens formula similar to the Petzval type is found, where two of the elements are separated by at least two-thirds of their diameter. This spacing allows the optical axis to change direction in the center of the lens, rather than being reflected outside the lens. A substantially smaller reflecting surface can therefore be used, since the ray bundle is at its smallest diameter within the lens itself. Second, the normal focusing travel of approximately four inches is cut in half by the use of a hinged supplementary lens. If the lens is raised two inches from its position for further focusing, a positive supplementary lens of approximately one-quarter diopter power will allow the lens to remain focused when lowered to its original position. The same two inch travel can then be repeated for the closer screen distances. This reduced focusing travel permits the lens diameter to be substantially decreased, and the projection head is again made smaller.

Slide trays containing a prearranged series of slides can be instantly attached to the outside of my projector. Since the slide projection elements occupy only the center portion of the head supporting structure, ample storage space is available within the closed case, on either side of the projection assembly. This space will accommodate several slide trays, a half-dozen film strip cans, and the electric cord.

Figure 3:
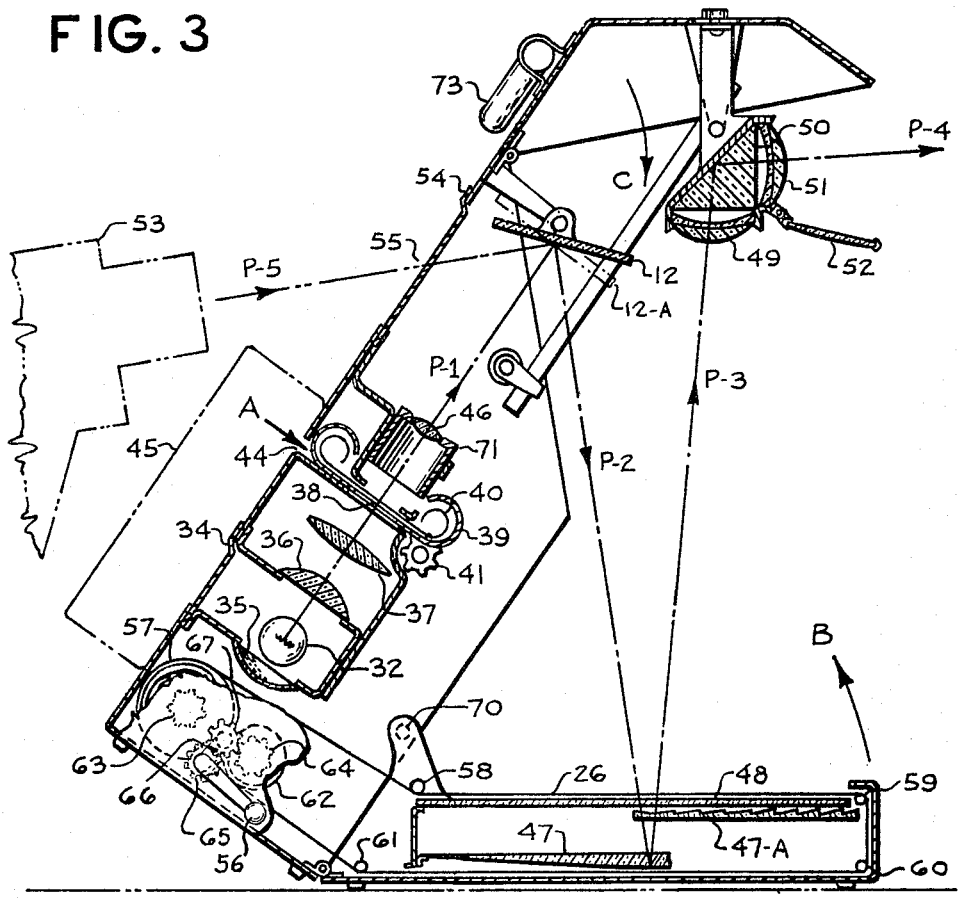
FIGURE 3 is a sectional view taken in the plane of the optical axis.

In the drawings, a three-sided main body 10, as shown in FIGURE 1, serves to house an internal projector assembly 11 and a pivoted first-surface mirror 12, supported by bracket 13. Lid 14 is attached to the upper end of main body 10 by hinge 15, and is held in correct focusing position by adjustable rod 16, which is moved by turning focusing knob 17 to rotate friction wheel 18. Rod 16 is held against wheel 18 by floating clip 19, and is fastened to lid 14 by pin 20, which is free to rotate. Projection head assembly 21 is attached to lid 14 by bracket 22 and is free to rotate for screen height adjustment about the pin joint which is aligned with the centerline light ray P-3 as shown in FIGURE 3. This screen height adjustment is accomplished by moving knob 23, which can be tightened to remain in any position. Hinged base 24 includes picture aperture 25, over which is looped a band of transparent material 26, the transparent material being supported by an image support member or glass 48 and usable for showing notations made before or during projection.

Main body 10 also houses the cooling system, wherein motor 27 drives blower 28 from current provided through electrical cord 29 and controlled by switch 30. Cool air is pulled in through cooling tunnel 31 past horizontal-burning projection lamp 32, as shown in FIGURE 3, and exhausted through opening 33, best shown in FIGURE 4. Access for bulb replacement is gained by sliding down cover 34. Small spherical reflector 35 and primary condenser 36 seal off the cooling tunnel from the remainder of the machine.

During normal operation as a complete unit, optical paths P-1, P-2, P-3 and P-4 are used. The light beam issuing from lamp 32 through condenser 36 then continues through secondary condenser 37, to illuminate small picture aperture 38. If film strips are to be used, adapter 39 is in place adjacent picture aperture 38, and filmstrip 40 is advanced past picture aperture 38 by sprockets 41, rotated by knob 42, seen in FIGURE 1, turning shaft 43. If individual slides are to be used, filmstrip adapter 39 is slid sidewise out of the picture aperture, and slides are inserted through opening 44 in the direction of arrow A, either manually or from an automatic slide tray 45, readily attached to the back of main body 10.

An image of the projection material in small aperture 38 is beamed along path P-1 by projection lens 46, deflected along path P-2 by mirror 12, and again reflected by concave reflector 47 along path P-3 to focus along the upper surface of support member or cover glass 48 in the plane of large picture aperture 25. Optical paths P-2 and P-3 do not coincide, and it will be seen that a double image will be formed by any material placed in the picture aperture, other than an aerial image, since this material will occupy two distinct and different positions relative to the optical centerline. The effect can be minimized in two ways: (1) reflector 47, actually a plano-convex lens with a second surface silvering on the convex side, can be located far enough below the picture aperture so that one image is completely blurred out when the other is in focus; (2) an alternate stepped reflector 47-A, similar to a first-surface aluminized negative fresnel, can be located as near to the picture aperture as possible, placing the two images so close together as to blend into one. This latter arrangement also allows hinged base 24 to be of a minimum thickness.

The image formed in the plane of picture aperture 25, plus any material added at this point, is projected onto a screen by projection head 21, which receives the image along optical path P-3 and redirects it along path P-4. Light intensity is preserved by concave reflector 47, which converges the light beam into a lower converging convex-concavo (meniscus) lens element 49 which comprises one element of the system's projection lens located in projection head 21 as shown in FIGURE 3. Thence the beam is reflected by the conventional 45° planar reflective surface of a prism 50 located just below the projection head's pivot point and out of the projection lens through an upper concavo-convex (meniscus) lens element 51. Hence, as illustrated in FIGURE 3, after leaving the transparency 26 the centerline light ray P-3 passes substantially radially through meniscus lens element 49 and is reflected by prism 50. The ray that departs from prism 50 (P-4) then passes substantially through the center of the projection lens' second meniscus lens element 51 as shown. When the shorter range of screen distances is used, supplementary lens 52 is rotated into position along optical path P-4.

Two other modes of operation are possible. When my device is to be used with an external projector 53, cover 54 is slid down to open an aperture 55 through which external images can be received along path P-5. Mirror 12 must be pivoted to position 12-A, so that image will be deflected downward along path P-2, thence along P-3 and P-4 as described above. Internal projector assembly 11 can also be used independently of paths P-2, P-3, and P-4 by tilting mirror 12 even further, so that the image along path P-1 is reflected out through aperture 55, along path P-5 but in the opposite direction.

Figure 4:
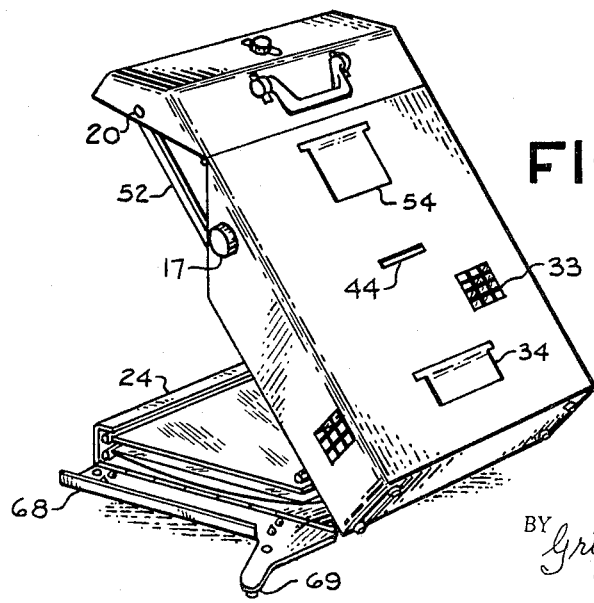
FIGURE 4 is a perspective view of the projector in operating position, as seen from the audience.

Details of the operation of the takeup crank 56 are shown in FIGURE 3. Transparent material 26 is looped from takeup spool 57 under roller 58, over cover glass 48, over rollers 59 and 60, back under reflector 47, under roller 61, and onto takeup spool 62. Gears 63 and 64 are connected to one end of each spool. Gear 65 is fixed to crank 56 and arm 66 is free to rotate while binding slightly on crank 56, having gear 67 rotatively connected to the end of arm 66 and in engagement with gear 65. Motion of crank 56 will cause gear 67 to be engaged with either gear 63 or gear 64, depending on the direction of crank motion. As shown in FIGURE 4, side panel 68 of base 24, hinged downward for replacement of the transparent material 26, or for cleaning reflector 47, is held in place by lugs 69, indexed into holes 70 to form a rigid unit.

Figure 2:
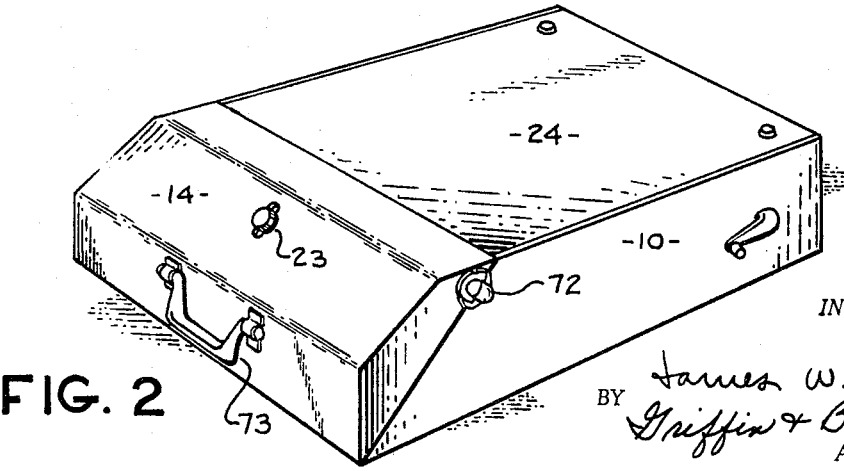
FIGURE 2 is a perspective view of the projector in its closed configuration, having formed its own carrying case.

In order to form a compactly portable, self-contained case as shown in FIGURE 2, lugs 69 are pressed inward to disengage them from holes 70, and base 24 is hinged upward in the direction of arrow B. Lid 14 is hinged downward along arrow C and covers the upper end of base 24. If supplementary lens 52 is extended in the position shown, it will be pushed into the proper stowed position upon contacting lower lens barrel 71. Latches 72 are sufficient to lock the entire unit, and handle 73 provides a convenient method of carrying the projector.

In order to comply with the statute, this invention has been described in considerable detail and in terms of one particular embodiment, but it is to be understood that these details, and the nature of the embodiment itself, are subject to various changes and variations, and the invention therefore is not to be limited in scope, except as may be indicated by the extent of the claims.

The embodiments of the invention in which an exclusive property or privilege is claimed are defined as follows:

1. An overhead projector comprising: a case, light source means affixed interiorly of and rigid with said case, a planar reflector effective to direct the beam from said light source downwardly through a picture aperture in said case, a planar reflector and projection lens movably supported by said case above said aperture and adapted to project images from said aperture along an angular light path onto a viewing screen, and a converging reflector behind said picture aperture effective to redirect said light beam back through said aperture and into said projection lens.

2. The invention as described in claim 1, in which the distance of said picture aperture above the bottom of said case is less than one-half the width of said picture aperture.

3. The invention in accordance with claim 2, further including means for supporting transparent pictorial material in the path of said light beam, and an image forming lens movably supported by said case and adapted to form images of said pictorial material substantially in the plane of said aperture.

4. A re-projection device adapted to receive the projected image from the light beam of a conventional projector upon an established focal plane, and means positioned at said plane for adding pictorial matter to projected images on said plane, said re-projection device comprising a substantially rectangular case having at least three fixed sides and one hinged side, the inner wall of said hinged side containing a picture aperture and the widest fixed side of said case having a generally rectangular aperture near the top thereof, a planar reflector adjacent said rectangular aperture, an image-forming lens movably supported by said case, and a concave reflector rigidly mounted beneath said picture aperture effective to receive and redirect said light beam into said image-forming lens; and, a generally conventional projector having a light source and lens and picture-forming elements disposed therebetween in its light beam, said projector being positioned whereby its light beam is directed generally horizontally through said rectangular aperture onto said planar reflector and thence downwardly through said picture aperture, said projector lens being adjusted in a manner whereby the images therefrom are sharply focused along the plane of said picture aperture.

5. An overhead projector adapted to form its own carrying case comprising: a generally rectangular box having at least three fixed sides and one hinged side, said hinged side containing an aperture for transparent pictures and a concave reflector thereunder, light source means rigidly attached interiorly of the widest of said fixed sides, an upper portion of said box hingedly attached to said widest fixed side, and a projection lens and planar reflector pivotally attached to said upper portion, said hinged side and said upper portion cooperating with said fixed portion to form an integral folded case, said case having one dimension less than the width of said picture aperture.

6. An overhead projector comprising: a case, light source means affixed interiorly of and rigid with said case, a reflector effective to direct the beam from said light source through a picture aperture in said case, a concave reflector behind said aperture, a planar reflector and projection lens movably supported by said case above said aperture, a band of flexible transparent material across said aperture and then behind said concave reflector, and single crank means for selectively moving said transparent material in either direction across said picture aperture, said concave reflector being effective to redirect said light beam back through said aperture and into said projector lens.

7. An overhead projector comprising: a case, light source means affixed interiorly of and rigid with said case, a reflector effective to direct the beam from said light source through a picture aperture in said case, and a planar reflector, projection lens and hinged supplementary lens movably supported by said case above said picture aperture, said planar reflector being positioned between two elements of said projection lens, and said supplementary lens being of such power as to reduce the required focusing travel of said projection lens by substantially one-half.

8. In a projection apparatus:
a light source;
an image support member for supporting an image and positioned to receive light rays from said light source;
optical converging means positioned on one side of said image support member for converging said light rays;
reflecting means positioned contiguous a surface of said optical converging means and to said one side of said image support member;
said reflecting means being operative to direct rays of light from said light source, passing through an image on said image support and converged by said optical converging means, back through said image; and
optical means for focusing said image on a viewing surface.

9. The projection apparatus of claim 8 and further comprising:
a transparent web;
first and second adjacent web storage spools carrying the ends of said web;
said web having an elongated looped path from the first of said spools over said image support member and thence under said converging and reflecting means to said second spool; and
drive means for selectively driving either of said spools to move said web in either direction along said path.

10. In a projection apparatus:
a light source;
an image support member for supporting an image and positioned to receive light rays from said light source;
optical converging and reflecting means positioned on one side of said image support member,
said optical converging and reflecting means being operative to converge and direct rays of light from said light source passing through an image on said image support member back through said image; and
optical means for focusing said image on a viewing surface.

11. In a projection apparatus:
a light source;
an optical converging means;
means for supporting an image in the optical path between said light source and said optical converging means;
a reflecting surface positioned adjacent to said optical converging means; and
optical means for focusing an image supported by said supporting means onto a viewing surface;
said converging means and said reflecting surface being operative to converge and direct light rays from said light source which have passed in one direction through said image, back through said image and toward said optical means for focusing.

12. The projection apparatus of claim 11 wherein said optical converging means comprises a lens.

13. The projection apparatus of claim 11 wherein said optical converging means comprises a stepped surface.

14. The projection apparatus of claim 13 wherein said reflecting surface is in contact with said stepped surface.

15. The projection apparatus of claim 11 and further comprising structural support means, said light source comprising a lamp and reflecting means positioned on said structural support means to receive image bearing rays of light from a second image and reflect said rays along said optical path.

16. The projection apparatus of claim 15 wherein said image-bearing rays of light are derived from an external projector.

17. The projection apparatus of claim 15 wherein said image-bearing rays of light are derived from a projection device mounted on said structural support means.

18. The projector of claim 11 wherein said optical means for focusing comprises:
a projection head including a first converging lens element having a first convex surface and a second concave surface,
a second converging lens element having a first concave surface and a second convex surface,
said elements being positioned substantially at right angles to each other, and
a reflector disposed substantially at 45 degrees relative to each of said elements, with said elements being positioned with their concave surfaces adjacent said reflector,
said projection head being positioned so that rays of light received from said reflecting surface enter said projection head through the first lens element, are reflected by the reflector, and exit through the second lens element.

19. In an overhead projection apparatus,
a base,
a light source positioned so as to direct light rays downwardly toward said base,
an optical converging means mounted on said base,
an image support means located in the optical path between said light source and said optical converging means and adjacent to and above said optical converging means,
a reflecting surface positioned adjacent to said optical converging means,
said converging means and said reflecting surface being operative to converge and redirect light rays from said light source which pass downwardly through said image, back through said image in an upward direction at a slight angle relative to said rays of light received from said light source; and
projection lens means positioned above said image for focusing said rays on a viewing surface.

References Cited by the Examiner
UNITED STATES PATENTS

| | | | |
|---|---|---|---|
| 1,539,579 | 5/1925 | Kucharski | 88—24 |
| 1,854,864 | 4/1932 | Semenitz | 88—24 |
| 2,076,103 | 4/1937 | Thorner | 88—24 |
| 2,168,225 | 8/1939 | Lewin | 40—134 |
| 2,496,647 | 3/1950 | Woodbury | 88—24 |
| 2,604,006 | 7/1952 | Hartmann | 88—24 |
| 2,859,660 | 11/1958 | Lucas | 88—24 |
| 3,051,041 | 8/1962 | Lehmann et al. | 88—24 |
| 3,126,786 | 3/1964 | Appeldorn | 88—24 |
| 3,222,986 | 12/1965 | Altman | 88—24 |

NORTON ANSHER, *Primary Examiner.*